United States Patent
Farrow et al.

(10) Patent No.: US 11,482,082 B2
(45) Date of Patent: Oct. 25, 2022

(54) NON-SCAN LOSS VERIFICATION AT SELF-CHECKOUT TERMINAL

(71) Applicant: NCR Corporation, Atlanta, GA (US)

(72) Inventors: Matthew K. Farrow, Canton, MA (US); Chris Wible, Cambridge, MA (US); Malay Kundu, Lexington, MA (US); Joshua Migdal, Wayland, MA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 15/708,044

(22) Filed: Sep. 18, 2017

(65) Prior Publication Data

US 2018/0096567 A1    Apr. 5, 2018

Related U.S. Application Data

(60) Provisional application No. 62/396,203, filed on Sep. 18, 2016.

(51) Int. Cl.
| | |
|---|---|
| *G07G 3/00* | (2006.01) |
| *G07G 1/12* | (2006.01) |
| *G06Q 20/40* | (2012.01) |
| *G07G 1/00* | (2006.01) |
| *G06V 20/40* | (2022.01) |
| *G06V 40/16* | (2022.01) |

(52) U.S. Cl.
CPC ......... *G07G 3/003* (2013.01); *G06Q 20/4016* (2013.01); *G06Q 20/40145* (2013.01); *G06V 20/40* (2022.01); *G06V 20/41* (2022.01); *G06V 40/161* (2022.01); *G07G 1/0009* (2013.01); *G07G 1/12* (2013.01)

(58) Field of Classification Search
CPC ........ G07G 3/003; G07G 1/0009; G07G 1/12; G06Q 20/40145; G06Q 20/4016; G06V 20/40; G06V 20/41; G06V 40/161
See application file for complete search history.

(56) References Cited

U.S. PATENT DOCUMENTS

| | | | |
|---|---|---|---|
| 7,631,808 B2 | 12/2009 | Kundu et al. | |
| 7,909,248 B1 * | 3/2011 | Goncalves | G07G 3/006 235/383 |
| 8,146,811 B2 | 4/2012 | Kundu et al. | |
| 2006/0243798 A1 * | 11/2006 | Kundu | G06Q 20/4016 235/383 |
| 2007/0241188 A1 * | 10/2007 | Liao | G06Q 20/201 235/383 |
| 2008/0226129 A1 * | 9/2008 | Kundu | G08B 13/19673 382/103 |

(Continued)

*Primary Examiner* — An T Nguyen
(74) *Attorney, Agent, or Firm* — Schwegman, Lundberg & Woessner

(57) ABSTRACT

A system and method for verifying a non-scan item at a self-checkout point-of-sale terminal is provided. A merchandise item that isn't scanned at the self-checkout terminal is identified by a detection system. Further, a user helper device is provided to verify the incident by prompting the shopper for an input. The user helper device is operably connected to the self-checkout point-of-sale terminal and the detection system to determine and verify a fraudulent incident occurring during a transaction activity by the shoppers. Further, a store attendant device is provided for human intervention when necessary.

20 Claims, 7 Drawing Sheets

(56) References Cited

U.S. PATENT DOCUMENTS

| | | | |
|---|---|---|---|
| 2010/0211471 A1* | 8/2010 | Haibara | G06Q 30/06 |
| | | | 705/21 |
| 2012/0321146 A1* | 12/2012 | Kundu | G06Q 20/202 |
| | | | 382/118 |
| 2014/0176719 A1* | 6/2014 | Migdal | G06K 9/00771 |
| | | | 348/150 |
| 2015/0193780 A1 | 7/2015 | Migdal et al. | |

* cited by examiner

NON-SCAN LOSS VERIFICATION AT SELF-CHECKOUT TERMINAL

TECHNICAL FIELD

The present invention relates generally to a security system and method to prevent fraudulent activities occurring at a self-checkout terminal.

BACKGROUND

When a shopper is detected with an un-scanned merchandise/item left in the cart at the end of a self-checkout transaction, it may indicate an intent to steal the un-scanned item by leaving the checkout terminal and the store with the un-scanned (thus unpaid) merchandise. However, another common case is that the shopper may intend to scan the un-scanned merchandise as part of a subsequent transaction, or the shopper simply forgets to scan the un-scanned item(s). Without being able to determine which case it is, a conventional basket-based loss detection system cannot give a verifiable indication to a self-checkout attendant or loss prevention/security personnel to verify the shopper's intent of stealing. In addition, there is currently no way to prompt or poll the shopper to verify the transaction in question without an attendant spending time to walk over and address the alert.

Therefore, what is needed is a system and method for verifying a fraudulent activity by receiving input from the shopper at the self-checkout terminal to reduce false-positive alerts and human intervention.

SUMMARY

The subject matter of this application may involve, in some cases, interrelated products, alternative solutions to a particular problem, and/or a plurality of different uses of a single system or article.

According to one aspect, a system for verifying a non-scan item detected at a self-checkout terminal is provided. The system may comprise a video source, in communication with a processor, generating a video feed capturing an area of interest at the self-checkout terminal. A non-scan item detection module may be in communication with the processor, detecting the non-scan item based on at least a portion of the video feed. A self-checkout terminal may be in communication with the processor, equipped with a scanner, detecting an item being transacted at the self-checkout terminal. Further, the system may comprise a self-checkout helper module, in communication with the processor and a computerized user interface. The self-checkout helper module may issue an alert to the computerized user interface and receive a response to the alert. The response may be inputted by a shopper via the computerized user interface. Lastly, the system may verify the alert based on the response.

In another aspect, a method of verifying a non-scan item detect at a self-checkout terminal is provided. The method may be operated via a computer processing unit. The method may begin with capturing a video feed of an area of interest at the self-checkout terminal using a video source. The method may continue with detecting the non-scan item based on at least a portion of the video feed, using a non-scan item detection module. Further, the method may comprise a step of issuing an alert to a computerized user interface in communication with the self-checkout helper device using the self-checkout helper device. Further yet, the method may comprise a step of receiving a response, via the computerized user interface, to the alert. Finally, the method may verify the alert based on the received response using the self-checkout helper device.

DESCRIPTION OF THE DRAWINGS

These and other advantages of the present invention may be readily understood with the reference to the following specifications and attached drawings wherein.

DETAILED DESCRIPTION

Figure 1:
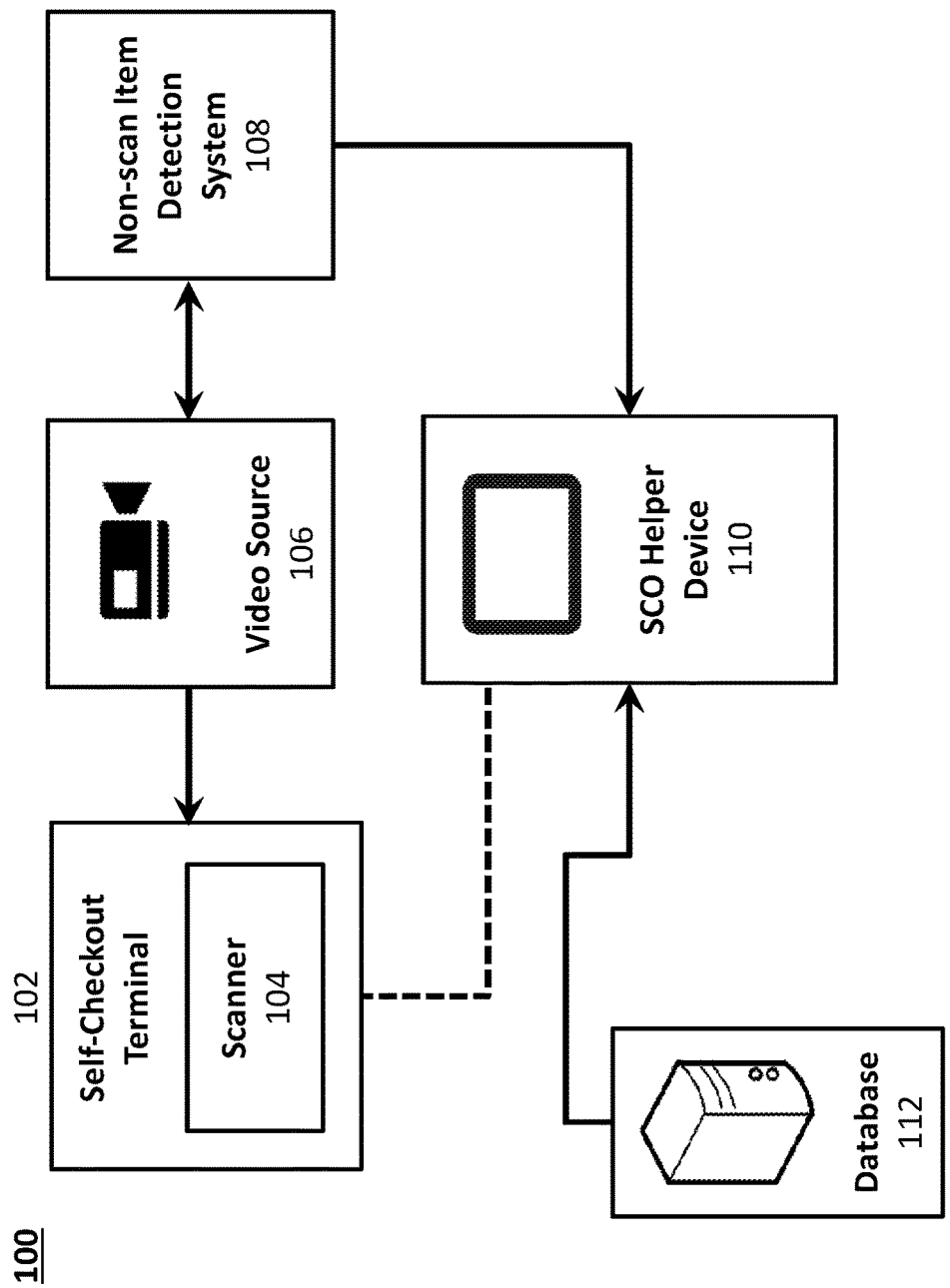
FIG. 1 provides an exemplary embodiment of the system for verifying a non-scan item detected at a self-checkout terminal.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

In referring to the description, specific details are set forth in order to provide a thorough understanding of the examples disclosed. In other instances, well-known methods, procedures, components and materials have not been described in detail as not to unnecessarily lengthen the present disclosure.

Preferred embodiments of the present invention may be described hereinbelow with reference to the accompanying drawings. In the following description, well-known functions or constructions are not described in detail because they may obscure the invention in unnecessary detail. No language in the specification should be construed as indicating any unclaimed element as essential to the practice of the embodiments. For this disclosure, the following terms and definitions shall apply:

The terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, circuitry is "operable" to perform a function whenever the circuitry comprises the necessary hardware and code stored to a computer readable medium, such as a memory device (if any is necessary) to perform the function, regardless of whether performance of the function is disabled or not enabled (e.g., by an operator-configurable setting, factory trim, etc.).

It should be understood that if an element or part is referred herein as being "on", "against", "in communication with", "connected to", "attached to", or "coupled to" another element or part, then it can be directly on, against, in communication with, connected, attached or coupled to the other element or part, or intervening elements or parts may be present.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As used herein, the terms "communicate" and "communicating" refer to (1) transmitting, or otherwise conveying, data from a source to a destination, and/or (2) delivering data to a communications medium, system, channel, network, device, wire, cable, fiber, circuit, and/or link to be conveyed to a destination.

The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list, or data presented in any other form. Database as used herein may be in the format including, but are not limiting to, XML, JSON, CSV, binary, over any connection type: serial, Ethernet, etc. over any protocol: UDP, TCP, and the like.

The term "exemplary" means serving as a non-limiting example, instance, or illustration. Likewise, the terms "e.g." and "for example" set off lists of one or more non-limiting examples, instances, or illustrations.

The term "network" as used herein includes both networks and inter-networks of all kinds, including the Internet, and is not limited to any particular network or inter-network. Network contemplated herein may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network may include multiple networks or sub-networks, each of which may include, for example, a wired or wireless data pathway. The network may include a circuit-switched voice network, a packet-switched data network, or any other network able to carry electronic communications. Examples include, but are not limited to, Picture Transfer Protocol (PTP) over Internet Protocol (IP), IP over Bluetooth, IP over WiFi, and PTP over IP networks (PTP/IP).

The term "processor" as used herein means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing.

As used herein, the words "about" and "approximately," when used to modify or describe a value (or range of values), mean reasonably close to that value or range of values. Thus, the embodiments described herein are not limited to only the recited values and ranges of values, but rather should include reasonably workable deviations.

As utilized herein, circuitry or a device is "operable" to perform a function whenever the circuitry or device comprises the necessary hardware and code (if any is necessary) to perform the function, regardless of whether performance of the function is disabled, or not enabled (e.g., by a user-configurable setting, factory trim, etc.).

The terminology used herein is for the purpose of describing particular embodiments only and is not intended to be limiting. As used herein, the singular forms "a", "an", and "the", are intended to include the plural forms as well, unless the context clearly indicates otherwise. It should be further understood that the terms "includes" and/or "including", when used in the present specification, specify the presence of stated features, integers, steps, operations, elements, and/or components, but do not preclude the presence or addition of one or more other features, integers, steps, operations, elements, components, and/or groups thereof not explicitly stated.

Various operations may be described as multiple discrete operations in turn, in a manner that may be helpful in understanding embodiments; however, the order of description should not be construed to imply that these operations are order dependent.

Spatially relative terms, such as "under" "beneath", "below", "lower", "above", "upper", "proximal", "distal", and the like, may be used herein for ease of description and/or illustration to describe one element or feature's relationship to another element(s) or feature(s) as illustrated in the various figures. It should be understood, however, that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, a relative spatial term such as "below" can encompass both an orientation of above and below. The device may be otherwise oriented (rotated 90 degrees or at other orientations) and the spatially relative descriptors used herein are to be interpreted accordingly. Similarly, the relative spatial terms "proximal" and "distal" may also be interchangeable, where applicable. Such descriptions are merely used to facilitate the discussion and are not intended to restrict the application of disclosed embodiments.

The terms first, second, third, etc. may be used herein to describe various elements, components, regions, parts and/or sections. It should be understood that these elements, components, regions, parts and/or sections should not be limited by these terms. These terms have been used only to distinguish one element, component, region, part, or section from another region, part, or section. Thus, a first element, component, region, part, or section discussed below could be termed a second element, component, region, part, or section without departing from the teachings herein.

Some embodiments of the present invention may be practiced on a computer system that includes, in general, one or a plurality of processors for processing information and instructions, RAM, for storing information and instructions, ROM, for storing static information and instructions, a memory device and instructions, modules as software units executing on a processor, an optional user output device such as a display screen device (e.g., a monitor) for display screening information to the computer user, and an optional user input device.

As will be appreciated by those skilled in the art, the present examples may be embodied, at least in part, a computer program product embodied in any tangible medium of expression having computer-usable program code stored therein. For example, some embodiments described below with reference to flowchart illustrations and/or block diagrams of methods, apparatus (systems) and computer program products can be implemented by computer program instructions. The computer program instructions may be stored in computer-readable media that can direct a computer, controller or other programmable data processing apparatus to function in a particular manner, such that the instructions stored in the computer-readable media constitute an article of manufacture including instructions and processes which implement the function/act/step specified in the flowchart and/or block diagram. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In the following description, reference is made to the accompanying drawings which are illustrations of embodiments in which the disclosed invention may be practiced. It is to be understood, however, that those skilled in the art may develop other structural and functional modifications without departing from the novelty and scope of the instant disclosure.

The system may comprise one or more computers or computerized elements in communication working together to carry out the different functions of the system. The invention contemplated herein further may comprise a memory device, such as a non-transitory computer readable media configured to instruct a computer or computers to carry out the steps and functions of the system and method, as described herein. In some embodiments, the communication among the one or more computer or the one or more processors alike, may support a plurality of encryption/decryption methods and mechanisms of various types of data.

The computerized user interface may be comprised of one or more computing devices in networked communication with each other. The computer or computers of the computerized user interface contemplated herein may comprise a memory, processor, and input/output system. In some embodiments, the computer may further comprise a networked connection and/or a display screen. These computerized elements may work together within a network to provide functionality to the computerized user interface. The computerized user interface may be any type of computerized interfaces known in the art capable of allowing a user to input data and receive a feedback therefrom. The computerized user interface may further provide outputs executed by the system contemplated herein.

Computer or computing device contemplated herein may include, but are not limited to, virtual systems, Cloud/remote systems, desktop computers, laptop computers, tablet computers, handheld computers, smart phones and other cellular phones, and similar internet enabled mobile devices, digital cameras, a customized computing device configured to specifically carry out the methods contemplated in this disclosure, and the like.

Video source or video camera contemplated herein may include, but are not limited to, a video camera such as, analog cameras and IP cameras, and the like; a device that can provide a video feed of any duration, such as a DVR; a portable computing device having a camera, such as a tablet computer, laptop computer; and the like.

The term "data" as used herein means any indicia, signals, marks, symbols, domains, symbol sets, representations, and any other physical form or forms representing information, whether permanent or temporary, whether visible, audible, acoustic, electric, magnetic, electromagnetic, or otherwise manifested. The term "data" is used to represent predetermined information in one physical form, encompassing any and all representations of corresponding information in a different physical form or forms. Data contemplated herein may be in the format including, but are not limiting to, XML, JSON, CSV, binary, over any connection type: serial, Ethernet, etc. over any protocol: UDP, TCP, and the like.

Scanner contemplated herein may process any type of machine-readable medium, including but not limited to a barcode, a QR code, two-dimensional bar code, a prescribed font, optical character recognition (OCR) characters, Radio Frequency Identification (RFID), Near-Field Communication (NFC), Bluetooth technology, alphanumeric characters, non-alphanumeric characters, symbols, facial recognition and the like.

The system and device disclosed herein may be implemented as a standalone and dedicated device including hardware and installed software, where the hardware is closely matched to the requirements and/or functionality of the software. The system and device may be installed on or integrated with a network appliance (not shown) configured to establish the network among the components of the system. The system and the network appliance may be capable of operating as or providing an interface to assist exchange of software instructions and data among the components of the system.

The system and device disclosed herein may implement a server. The server may be implemented as any of a variety of computing devices, including, for example, a general purpose computing device, multiple networked servers (arranged in cluster or as a server farm), a mainframe, or so forth.

In some embodiments, the network appliance may be preconfigured or dynamically configured to include the system integrated with other devices.

In a further embodiment, the device may be installed on or integrated with one or more devices such as a computing device. For example, a smartphone or a tablet to perform the functionalities of the system disclosed herein.

In a further embodiment, the system and device disclosed herein may be integrated with any number of devices in a distributed fashion.

The system disclosed herein may be implemented in hardware or a suitable combination of hardware and software. In some embodiments, the system may be a hardware device including processor(s) executing machine readable program instructions for analyzing data, and interactions between the components of the system. The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor(s) may include, for example, microprocessors, microcomputers, microcontrollers, digital signal processors, central processing units, state machines, logic circuits, and/or any devices that manipulate signals based on operational instructions. Among other capabilities, the processor(s) may be configured to fetch and execute computer readable instructions in a memory associated with the system for performing tasks such as signal coding, data processing input/output processing, power control, and/or other functions. The system may include modules as software units executing on a processor.

The system may include, in whole or in part, a software application working alone or in conjunction with one or more hardware resources. Such software applications may be executed by the processor(s) on different hardware platforms or emulated in a virtual environment. Aspects of the system, disclosed herein, may leverage known, related art, or later developed off-the-shelf software applications. Other embodiments may comprise the system being integrated or in communication with a mobile switching center, network gateway system, Internet access node, application server, IMS core, service node, or some other communication systems, including any combination thereof. In some embodiments, the components of system may be integrated with or implemented as a wearable device including, but not limited to, a fashion accessory (e.g., a wrist band, a ring, etc.), a utility device (a hand-held baton, a pen, an umbrella, a watch, etc.), a body clothing, or any combination thereof.

The system may include a variety of known, related art, or later developed interface(s) (not shown), including software interfaces (e.g., an application programming interface, a graphical user interface, etc.); hardware interfaces (e.g., cable connectors, a keyboard, a card reader, a barcode reader, a biometric scanner, an interactive display screen, etc.); or both.

The issued U.S. Pat. No. 7,631,808 describes in detail the process of video analysis and transaction data analysis. As such, the issued U.S. Pat. No. 7,631,808 is incorporated herein by reference.

In its essence, U.S. Pat. No. 7,631,808 describes methods and apparatus for detecting a transaction outcome such as a suspicious activity related to a transaction (e.g., purchase, refund, void, etc.) of items by a customer at a transaction terminal (i.e. self-checkout terminal). The system obtains video data associated with a transaction area. The video data may be obtained, for example, from an elevated camera focused on a cash register check out or other transaction area in a supermarket or other retail establishment. The system applies an automated machine video analysis algorithm that is disclosed as part of the system to analyze at least a portion of the video data to obtain at least one video parameter concerning at least a portion of a transaction associated with the transaction area. As an example, the system can analyze the video data to track (e.g. identify the presence of) items involved in the transaction in the transaction area. This process can automatically identify the presence of an item involved in the transaction from the video data analysis. This can be done, for example, by automatically detecting item activity in the transaction area and/or detecting operator activity in the transaction area. Detection of item presence can include detecting removal of an item from a region of interest in the transaction area and/or detecting introduction of an item into a region of interest in the transaction area.

Generally, the present invention concerns a system and method for verifying a non-scan item detected at a self-checkout terminal. The system comprises a video source, such as a camera, recording a video feed of the activities and/or events occurring at and around the self-checkout terminal (i.e. transaction activity, suspicious activity, fraudulent activity and the like). The system further comprises a non-scan item detection system to detect an item left un-scanned (hereinafter also referred to as "non-scan item") at the self-checkout terminal, shopping cart, basket, and the like. The system comprises a computer processing unit which analyzes the video feed to identify the non-scan item. Further, the system comprises a self-checkout helper device which acts as a communication channel between the shopper and the attendant, to verify whether the non-scan item detected by the non-scan item detection system constitutes a fraudulent activity. Thus, the system and method for verifying a non-scan item disclosed herein provides a loss-prevention system and method that reduce false-positive rates in fraudulent activity detection and reduce a need for a human intervention.

In one aspect, the present disclosure identifies a method for verifying a fraudulent activity that may occur at a self-checkout terminal. Specifically, the present disclosure provides a method to verify an un-scanned item detected by a scan-avoidance/non-scan item detection system by additionally verifying the un-scanned item with an input received from a customer-user (i.e. shopper). The present disclosure may validate one data feed that identifies an un-scanned item at a self-checkout area (such as a basket, cart, counter, scanning area, and the like) based on an input received from the shopper. A computer processing unit may be operable to analyze a data feed generated by monitoring an item being scanned at the self-checkout terminal.

In another aspect, the system disclosed herein comprises a self-checkout helper device. The purpose of the self-checkout helper device (hereinafter also referred to as "SCO helper device") is to interface with a non-scan item detection system to then proactively interact with the shopper to verify, validate, prevent, deny, or confirm a potential non-scan item loss at the self-checkout terminal and to alert an attendant or customer service personnel accordingly.

In yet another aspect, the present disclosures improves detection and prevention of non-scan item loss by providing a basket-based non-scan loss verification system and method. Similarly, the system employing the self-checkout helper device can be utilized to prevent counter-based non-scan Loss.

The term "basket" refers to a shopping bin for carrying items to be purchase at a store. Baskets may include, but are not limiting to, shopping cart, shopping carriage, shopping basket, and the like.

The system and method for verifying a non-scan item at a self-checkout terminal is presented. The present system may be utilized to verify a fraudulent activity at the self-checkout terminal detected by a computer processing unit based on data feed obtained by various sensors. The system and method for verifying a non-scan item at a self-checkout terminal also may be utilized to prevent fraudulent activities, such as theft, from occurring at the self-checkout terminal.

Examples of fraudulent activities may include, but are not limited to, when a customer at the self-checkout terminal places an item that is not being transacted in a bagging area; places another item in place of the item being purchased in a bagging area; places an item outside of the bagging area, such as on the floor, input area, or other areas not specifically designated for collection of purchased item, without transacting it through the self-checkout terminal; and takes unpurchased items following the end of the transaction; and the like.

In one aspect, the system and method disclosed herein may integrate, implement, or utilizes a device which, upon detection of un-scanned item(s) from a non-scan loss detection system, directly communicates with the shopper during or after a transaction to serve the following purposes: (1) remind/prompt shopper to scan all of the items in case he/she forgot; (2) allow an honest shopper to indicate information which may mitigate suspicion, for example, if an honest shopper is planning to "split" the transaction and pay for the un-scanned merchandise as part of a subsequent transaction; a detected un-scanned item is a non-merchandise item (such as a handbag or mobile phone); and (3) determine if a shopper may be trying to steal, and alert a store personnel, such as a self-checkout attendant, customer service or loss prevention/security personnel, and the like.

Additionally, the system and method disclosed herein may deter the shoppers from engaging in non-scan fraudulent activity in the future by alerting the shopper to the existence of a potentially suspicious activity during a transaction at the self-checkout terminal, such that the shopper may be able to self-correct.

The non-scan item detection system, described in U.S. Pat. No. 8,146,811, employs a cart Inspector module to compare an image of a shopping cart with a predefined image of an empty shopping cart according to U.S. Pat. No. 8,146,811. The system and method described therein utilizes an image comparison and/or analysis to identify the non-scan item left in a shopping cart. The method, carried out by a computer processing unit, utilizes an image comparison function to compare an instant image of the shopping cart and a model image of the shopping cart depicting an empty shopping cart. Thus, the non-scan item detection system may identify a difference between the images. If different, the instant image may be an image of a suspicious transaction or a false positive condition.

There are many methods available for image comparison including histogram color analysis, geometric analysis, and edge comparison analysis. One embodiment employs the use of a multi-resolution correlation technique. The images in the database are transformed into a pyramid image using a wavelet transform. A correlation score is computed and a match is determined by comparing against a confidence threshold. Those items that have no matches are considered suspicious.

In some embodiments, a self-checkout helper device may be positioned at each self-checkout terminals at a store. A non-scan item detection system, such as the one described in U.S. Pat. No. 8,146,811, incorporate herein by reference, can be used to identify and/or detect a non-scan item left in the cart or at the input region (such as the input shelf of the self-checkout terminal) or non-weight-checked output areas (such as the floor or bagging areas). Once the non-scan item detection system detects a non-scan item, an alert may be sent to the self-checkout helper device. The self-checkout helper device may be in communication with a computerized user interface, such as a display to alert the shopper about the non-scan item detection and to allow the shopper to address the issue.

The system and method for verifying a non-scan item detected at a self-checkout terminal may comprise a video source (i.e. CCTV camera) recording a video feed of an area of interest (i.e. shopping cart, basket, input area, bagging area, floor, etc.). Further, the system may comprise a non-scan item detection system and a self-checkout helper device. The self-checkout terminal may be equipped with a scanner that generates a transaction data as it scans an item being transacted at the self-checkout terminal.

FIG. 1 shows an exemplary embodiment of the system for verifying a non-scan item detected at a self-checkout terminal. The video source 106 generates a video feed (i.e. video recording) of the self-checkout terminal 102. The self-checkout terminal 102 may be equipped with a scanner 104 to scan the item's machine-readable code, such as a barcode, QR code and the like. While in this systematic diagram, the video source monitors the self-checkout terminal, it may be positioned and/or configured to monitor a specific area of interest, such as the bagging area or the transaction area. The bagging area refers to an area within the self-checkout terminal where a shopper places a transacted item into a bag. The transaction area generally refers to an area within the self-checkout terminal where a transaction of an item occurs, such as a scanning area.

The non-scan item detection system 108 may be in communication with the video source 106 to obtain video and/or image of the area of interest at the self-checkout terminal. The SCO helper device 110 may be positioned at the self-checkout terminal 102 to provide its function to the shopper at the location. The SCO helper device 110 may receive a notice from the non-scan item detection system 108 when a non-scan item is detected by the non-scan item detection system 108. A database 112 may be in communication with the SCO helper device 110.

Figure 2:
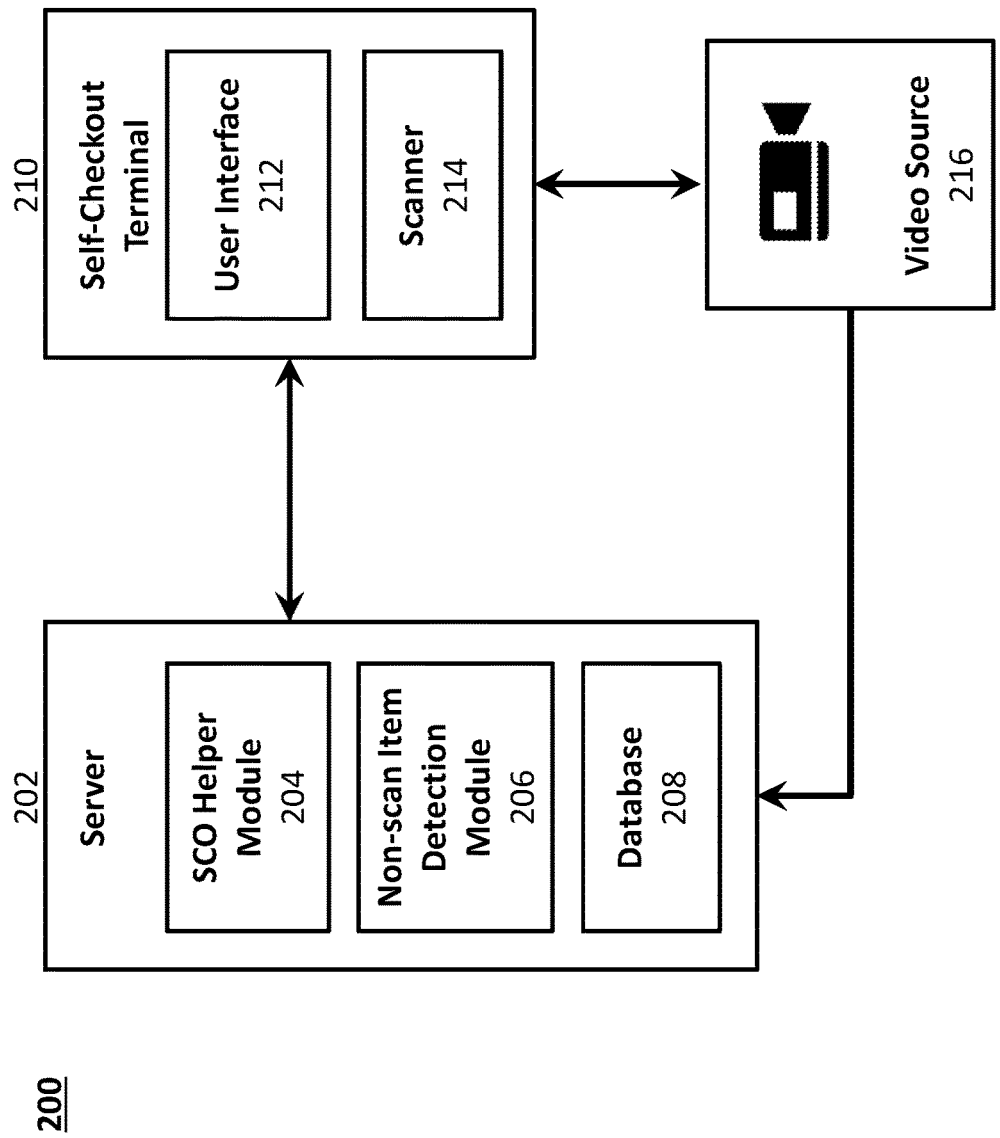
FIG. 2 provides another exemplary embodiment of the system for verifying a non-scan item detect at a self-checkout terminal.

FIG. 2 shows another exemplary embodiment of the system for verifying a non-scan item detected at a self-checkout terminal. In this embodiment, functions of the SCO helper device 110 and the non-scan item detection system 108 may be implemented by a server 202. The server may be in communication with the self-checkout terminal 210 and the video source 216. The SCO helper module 204 may issue an alert and/or communicate with the user interface 212 installed at the self-checkout terminal 210. The self-checkout terminal 210 further employs the scanner 214 for generating transaction data. The function of the non-scan item detection system as described herein may be operated by the non-scan item detection module 206 implemented by the server 202. The server 202 may further include a database 208.

The system may use a CCTV footage as a video feed obtained from a camera such as, analog cameras, IP cameras, digital coax cameras and the like. The transactions data may be obtained from the self-checkout system or any other type of POS (point of sales) system. The system may also capture data feed from other sensors and retail store metadata not depicted herein. The CCTV camera may capture a video feed data of the shopper interacting with the shopping cart, merchandise/non-merchandise items, and the self-checkout system itself. The non-scan item detection system may correlate video feed data with the transaction data. The system may analyze such data in real-time (or near real-time) and generate event(s) of items potentially not scanned during the transaction. These events can then be sent to the self-checkout helper device. The SCO helper device may be mounted on the self-checkout system, a standing podium, or any other place where the shopper can visibly see the SCO helper device. The system may further comprise an attendant user device, for example a tablet. The attendant user device may be in communication with the SCO helper device to exchange (i.e. receive and send) communications from the SCO helper device. The attendant user device may be a wearable device, such as, a smart watch, a portable tablet, a Self-Checkout RAP (Remote Assistant Program), a Self-checkout portable RAP, and the like.

The self-checkout helper device may have a computerized user interface operating therein. For example, the self-checkout helper device may be a standalone computing device. The self-checkout helper device may prompt the shopper (the customer-user) to verify the un-scanned item. The self-checkout helper device may prompt the shopper via the computerized user interface subsequently after the non-scan item detection system identifies an item left un-scanned. Alternatively, the self-checkout helper device may prompt the shopper after a predetermined time period from the time of non-scan item detection system identifying the un-scanned item. This is to give the shopper a reasonable amount of time in between the scanning of multiple items at the self-checkout terminal.

As discussed herein, the SCO helper device may be directly integrated with the SCO (self-checkout terminal). Similarly, the non-scan item detection system may be integrated with the SCO. In another aspect, the functions of the self-checkout helper device may be implemented by the self-checkout terminal. For example, the methods carried out by the self-checkout helper device may be implemented by another computing device, such as a self-checkout computer.

The system and method disclosed herein may be operated via a computer processing unit. The computer processing unit may be operable to analyze a data feed generated by monitoring an item being scanned at the checkout terminal (i.e. scanner, video source, and the like). The data feed may comprise a video feed and a transaction data. The data feed may be obtained by the computer processing unit to identify and/or verify a fraudulent activity. The video feed may be obtained from the video source monitoring an item placed at a transaction area or other areas of interest at the self-checkout terminal.

In some embodiments, a video analysis may be utilized to verify the possible fraudulent activity. A video feed may be generated by a video source monitoring activities at a transaction area. The transaction area is not limited to a certain section of the self-checkout terminal, but may include surrounding areas of the self-checkout terminal. The video analysis may be conducted via the computer processing unit where the video feed is analyzed frame by frame to identify the possible fraudulent activity. The frame-by-frame analysis may identify an item that is not being sold at the store, in which case such activity may not be the possible fraudulent activity. The video feed of the item before and after being placed at the bagging area may be analyzed to verify the possible fraudulent activity. Various video analysis techniques are available and the method and process of the video analysis pertaining to the present invention is being incorporated herein by reference.

A loss incident may be verified by the video analysis. The loss incidents contemplated herein may include, but are not limited to, when a customer neglects an item in a cart, a theft activity, and the like. The loss incident may occur when the item is not being placed at the bagging area and/or the transaction area. The lost incident may undergo a video analysis contemplated herein, using the non-scan item detection module, to verify whether the loss incident truly occurred or not.

In some embodiments, the loss incident at a self-checkout terminal may be verified by obtaining a video feed generated from the video source monitoring an item at a transaction area. The video feed may be a partial video feed of the item during a transaction time. The transaction time indicates a period of time from the item being introduced to the self-checkout terminal to a payment being successfully transacted. The video analysis of the video feed conducted by the computer processing unit may be verified by utilizing the self-checkout helper device.

The transaction data may comprise variety of information of the item as it is scanned through the checkout terminal. For example, the transaction data may comprise the identity of the item, the transaction time (i.e. scan time), the price of the item, and the like. When multiple items are scanned, the transaction data may also include transaction count which refers to a number items scanned via the scanner equipped by the checkout terminal. As the transaction count is identified using the scanner, the transaction count may be compared with a scan count of the items being placed at the bagging area.

The transaction data obtained by the checkout terminal may comprise a variety of information of the item as it is scanned through the checkout unit's scanner. For example, the transaction data may comprise the identity of the item, the transaction time (i.e. scan time), the price of the item, and the like. A plurality of items and their corresponding prices and identities may be catalogued and stored in the database. The transaction time refers to a point in time (i.e. temporal position) in which the transaction of an item is detected (i.e. scan time). When multiple items are scanned, the transaction data may also include transaction count which refers to a number items scanned via the scanner equipped by the checkout terminal. As the transaction count is identified using the scanner, the transaction count may be compared with a count of the items being placed at the bagging area.

In some embodiments, a transaction data may be correlated to the video analysis in order to verify the possible fraudulent activity. Using a combination of video analysis and/or image analysis in comparison with transaction data, the system can determine if the presence of the item identified in the analysis of the video feed has a corresponding presence in the transaction data, and if not, the system may identify such transacted item as a non-scanned item based on such discrepancy appearing, as a result of a correlative analysis between the transaction data and the video/image analysis. As an example, the system can compare one or more data feed types to at least a portion of the transaction data to identify at least one discrepancy in a number of items transacted at the checkout terminal. Transaction data such as transaction count (e.g. scan count), thus represents the presence of an item or a number of items scanned by the scanner, while the item count from the video analysis represents the presence (or number) of items that the customer causes to move through the transaction area monitored by the video feed.

By way of example, the transaction count from the transaction data may be compared to the item count identified from the video analysis. When there is a discrepancy between the two counts (i.e. mismatch in count data from two different data type), the system may identify the transaction involving such discrepancy at the self-checkout terminal as a potentially fraudulent activity. In this example, the loss of an item at the store may be prevented when the transaction count is smaller than the item count from the video analysis, which indicates that there is an un-scanned item present. Such incident can occur even when there is no item left in the shopping cart. An item may pass through the transaction area without being scanned by the scanner.

The self-checkout helper device may generate an alert prompting the shopper at the self-checkout terminal upon receiving a detection of a non-scan item from the non-scan item detection system. In some embodiments, the shopping cart may not contain any non-scanned item. Thus, the shopper is not prompted with any alert by the SCO helper device.

Figure 3:
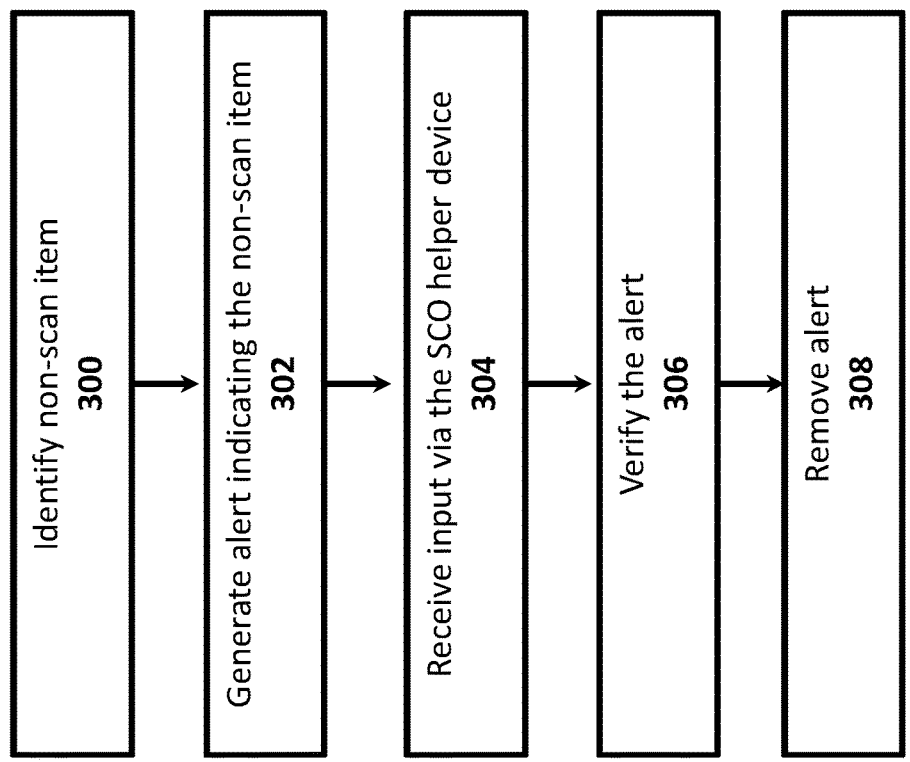
FIG. 3 provides an exemplary flowchart demonstrating the use of the SCO helper device.

Referring now to FIG. 3, in another embodiment, the shopper may mistakenly leave an item in the shopping cart. As the non-scan item is detected by the non-scan item detection device 300, the shopper may be prompted with an alert by the SCO helper device, thus the SCO helper device may generate the alert at 302. The alert may be in a form of a question. For example, the SCO helper device may prompt the shopper to verify whether the shopper is still conducting the transaction activity. The shopper may provide an input to the SCO helper device via the user interface. Thus, the SCO helper device may receive input via the SCO helper device 304. The input received by the SCO helper device may be in text form (such as typing), a selection the shopper makes (such as tapping on touch screen), a speech (i.e. voice input) and other various input methods known.

As the shopper continues with the transaction leaving no non-scan item in the transaction area, the alert may be removed 308, upon verifying the alert 306 once again, with the non-scan item detection system. Thus, the non-scan item detection device may conduct another sequence of detection cycle at the request of the SCO helper device as the transaction events continuously occurs at the self-checkout terminal by the shopper.

Figure 4:
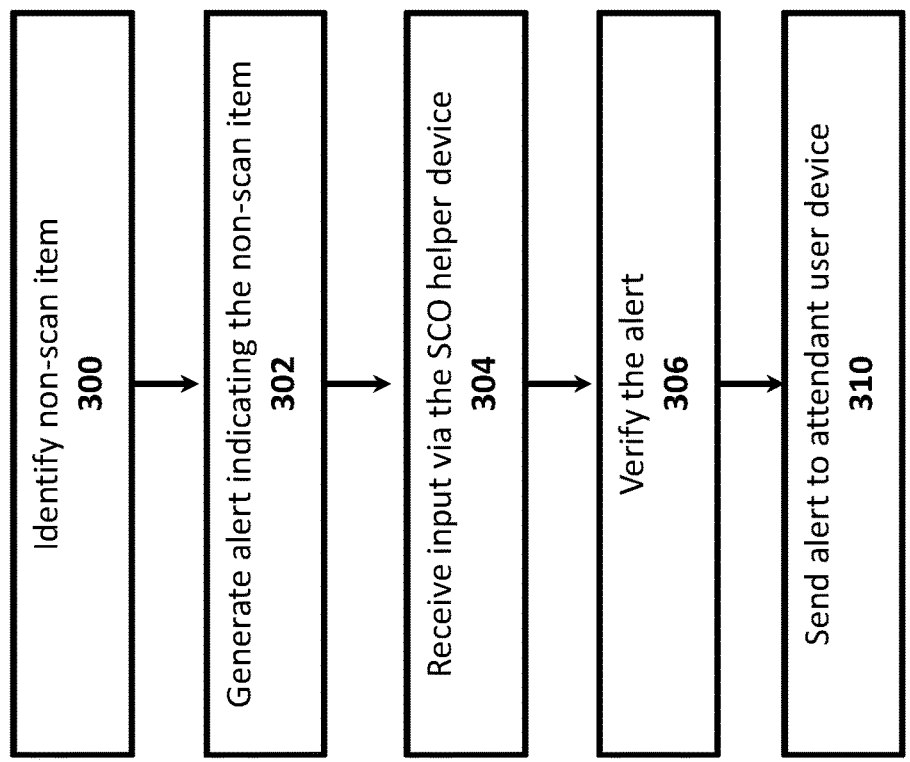
FIG. 4 provides an exemplary flowchart demonstrating the use of the SCO helper device.
Figure 5:
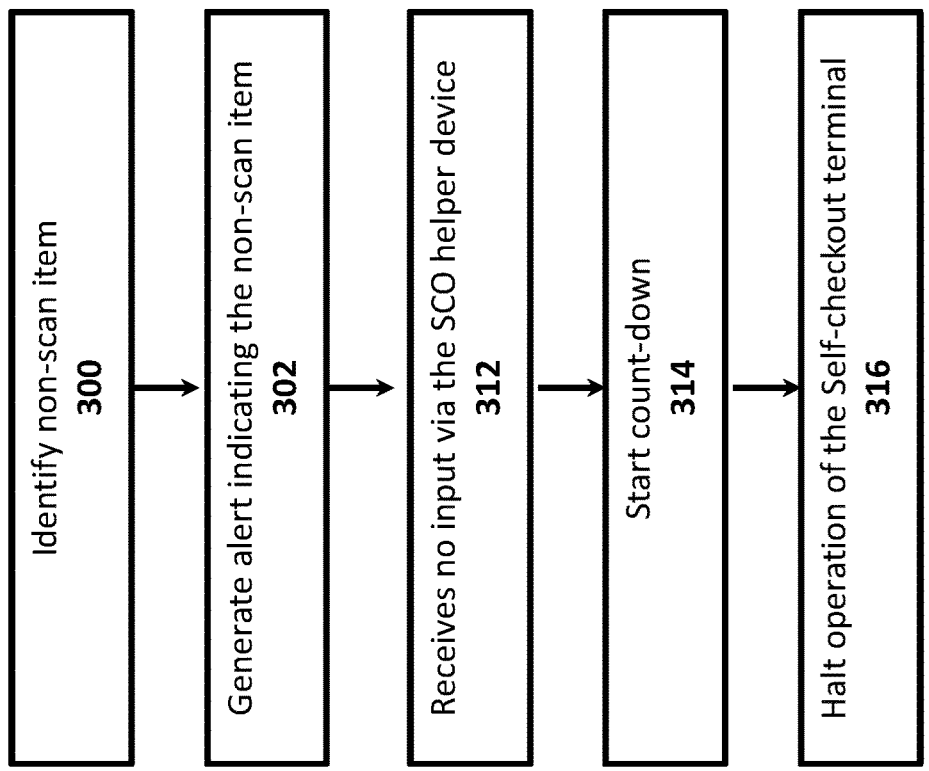
FIG. 5 provides an exemplary flowchart demonstrating the use of the SCO helper device.

In some embodiments, the non-scan item detection device may generate a false-positive alert. As the non-scan item detection device generates an alert indicating the non-scan item 302 in the shopping cart, the SCO helper device may prompt the shopper with the alert requiring a verification of the alert by the shopper. As the SCO helper device receives the shopper's input 304 indicating that the alert is false-positive, the SCO helper device may retract the alert upon verifying the alert 306. Alternatively, the SCO helper device may send an alert to the attendant user device 310, as shown in FIG. 4. The attendant may be notified of the individual self-checkout terminal's alert level via the attendant user device. When the alert level is higher, the SCO helper device may send an alert to the attendant user device requiring a human verification by the attendant.

In some embodiments, the SCO helper device, upon generating an alert 302, may not receive any input from the shopper. For example, the shopper may simply ignore or be unaware of the alert being received by the SCO helper device. In one aspect, the SCO helper device may request the self-checkout terminal to halt the transaction operation 316. Alternatively, the SCO helper device may send an alert to the attendant user device 310. The SCO helper device may be preset with a set duration to receive any input from the point in time when the alert is generated by the SCO helper device. Thus, the SCO helper device may start a countdown 314 upon generating the alert at 301. When no input is received by the SCO helper device 312 upon expiration of the countdown (i.e. the set duration of time), the SCO helper device may configure the operation of the self-checkout terminal to be halted 316. By way of example, the SCO helper device may allow 10 seconds of wait time after the alert has been issued by the SCO helper device to the shopper at the self-checkout terminal.

In some embodiment, the shopper may ignore the alert being issued by the SCO helper device and leave the transaction area or the self-checkout terminal. Upon detecting the shopper leaving the area, the SCO helper device may send an alert to the attendant user device for an intervention. The detection of the shopper leaving the transaction area may be performed in various methods by various systems, including but not limiting to, including video analytics systems and/or a motion detection system which detect shopper presence or shopping cart tracking systems, proximity detectors, etc.

The SCO helper device may be utilized to prevent any loss of un-scanned items by simply issuing a notice via the SCO helper device to the shopper. The shopper may be mistakenly left an item in the shopping cart. The SCO helper device may request the shopper to scan the item left in the shopping cart. Once the self-checkout terminal detects the missing item scanned, the SCO helper device may remove the notice and return to normal operation.

Figure 6:
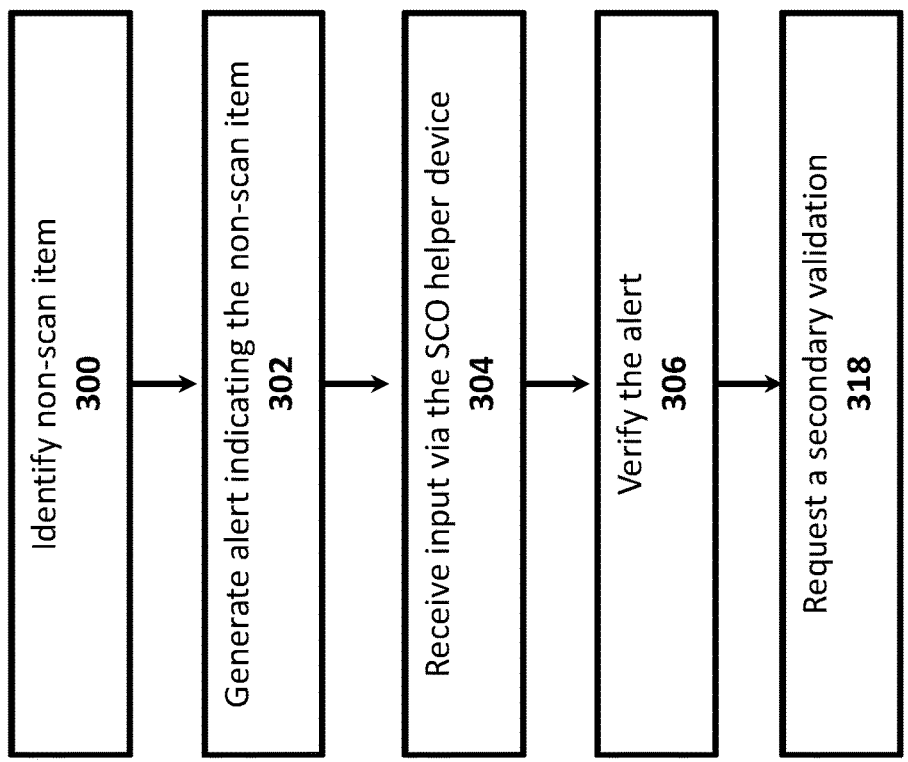
FIG. 6 provides an exemplary flowchart demonstrating the use of the SCO helper device.

Now turning to FIG. 6, in some embodiments, the shopper may intend to conduct more than one transaction for a given set of items to be purchased. In this embodiment, the non-scan item detection device may detect the non-scan item remaining within the shopping cart 300. Consequently, the SCO helper device may prompt the shopper with an alert 302 in a form of a question and receive an input from the shopper via the SCO helper device 304. The SCO helper may prompt the shopper to verify whether there may be another transaction to occur at the self-checkout terminal. As there may be a case of the shopper falsely indicating that there may be another transaction, the alert may further require a secondary verification. In FIG. 6, the alert is verified by the non-scan item detection system at 306 after receiving the input from the shopper via the SCO helper device 304. The SCO helper device may continue further with sending a request for a secondary validation 318 to the attendant user device. In one aspect, the secondary verification may be requested to the attendant user device. In another aspect, the secondary verification may be requested to the central computing device for another video/image comparison analysis.

In some embodiments, the shopper may attempt to leave the transaction area with the non-scan item upon receiving an alert via the SCO helper device. The shopper may falsely indicate that there is no non-scan item at the transaction area using the SCO helper device. In this embodiment, the SCO helper device may send an alert to the attendant prompting a human validation by the attendant.

The SCO helper device may prompt the shopper via the computerized user interface with alert in the form of a question. The alert may take various forms, including a question. Such alert may be categorized into various level. For example, a yellow alert may be set as a medium level alert which indicates a level of possibility where the fraudulent activity may take place. Similarly, a red alert may be set as a high-level alert indicating a higher possibility of the fraudulent activity taking place. The alert may be generated in different forms, which may include, but not limited to, visual message, text message, audible message, and the like.

The SCO helper device may present the alert in the form of a notice, such as a warning. The SCO helper device may prompt the shopper with several options from which the shopper can choose via the computerized user interface (e.g. the self-checkout helper device's display). These are customizable by the retailer. Thus, the self-checkout helper device may receive an input from the shopper via the SCO helper device, based on which a possible fraudulent activity (such as an un-scanned items) may be verified. The type of questions and options (i.e. answers) are illustrated in examples shown below.

For example, some default options may include, "I'm still scanning" to indicate that the shopper is not done scanning all the items, "I have another transaction" to indicate that the shopper intends to scan the un-scanned items in another transaction, "I've scanned everything" to indicate that there are no un-scanned items or that the shopper has no intention of scanning any more items, and "I need help" to indicate that the self-checkout attendant should help this shopper finish the transaction.

The alert provided to the shopper via the SCO helper device may employ various types of communication. The alert may include a text, graphic, image, or video representation of the un-scanned item(s). This includes the possibility of displaying an image or video clip recorded directly from the current transaction of interest. The image or video may include the shopper or crop or obfuscate the imagery to hide their identity. The more specific the alert (e.g., showing the shopper circumventing the scan of a carton of eggs or giving up on a hard-to-scan gallon of milk) the better the ability for the shopper to understand and rectify the situation by correctly scanning the un-scanned item of interest.

An alert also may be sent to the attendant user device when an attendant's validation of the detected non-scan item is needed. The computerized user interface employed by the attendant user device may provide the attendant an alert issued by the one or more processors. The alert being issued by the one or more processors may be in any form discussed herein. The computerized user interface of the attendant user device may provide the attendant an alert issued by the SCO helper device. The alert being issued may be in any form. The alert may be a visual alarm, such as light or other visual signals presented by the computerized user interface. The alert may be an audible alarm. The alert may be an alert message presented on the computerized user interface.

Figure 7:
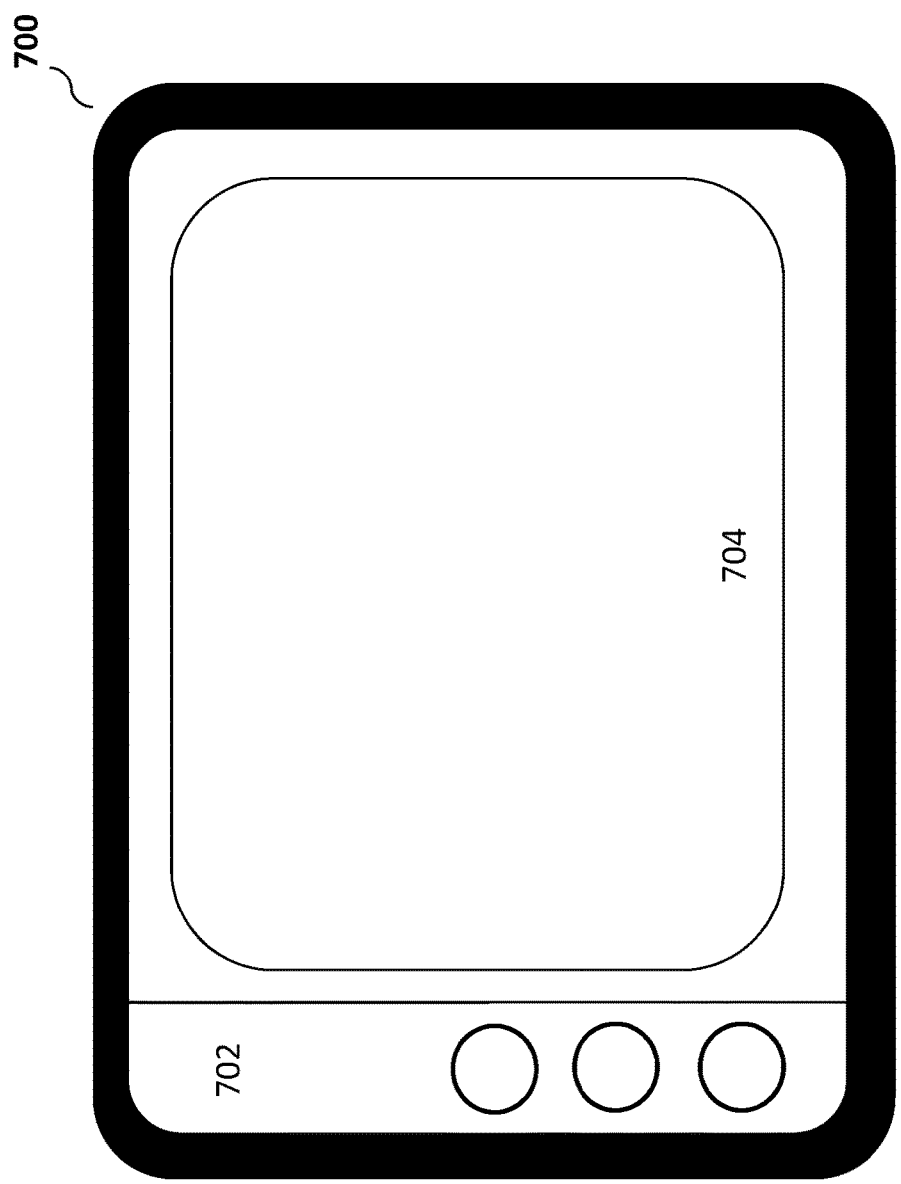
FIG. 7 provides an exemplary flowchart demonstrating the use of the SCO helper device.

FIG. 7 illustrates an exemplary embodiment of the computerized user interface provided by the SCO helper device to the shopper. The SCO helper device 700 may provide a user interface area 704 where the alert may be presented. The shopper may, using the SCO helper device, provide an input to the alert via the user interface. In some embodiments, the SCO helper device may present a control panel 702 for the shopper to interact with the user interface provided by the SCO helper device.

The SCO helper device may present a waiting screen via the computerized user interface. The waiting screen of the self-checkout helper device can be used for many purposes. In one aspect, it may be configured to display the retailer's logo. In another aspect, it can be used as an advertisement space from vendors or retailers to advertise products, services, coupons, or any other information the retailer or their affiliates want to put in front of their shoppers.

The system and method disclosed herein may implement a face recognition function utilizing the video source. The self-checkout helper device, when equipped with a front-facing camera, may take images of the shoppers using the front-facing camera and identifies the shopper at the self-checkout terminal. In one embodiment, the system may associate images of shoppers, such as their faces, using standard face recognition techniques, with the ongoing transaction at the self-checkout terminal. This enables shopper tracking capabilities that links the shopper's identity as the shopper is identified using the face recognition function. Such information can be used to track purchases, issue rewards, personalize coupons and other incentives, personalize advertisement displayed on the Self-checkout helper device or other devices, as well as for loss prevention purposes.

When any fraudulent activity (i.e. un-scanned item) is identified by the non-scan item detection system, the face recognition system may identify the shopper and the identity may be tagged with such incident. In some aspect, the shopper's identity can be put on a watch list. Upon identifying that shopper again via the face recognition system, the shopper's identity can be compared to the watch list, and an alert can be generated to alert the attendant of the presence of the shopper in question. The alert may be generated to the SCO helper device and/or the attendant user device. In some aspect, the facial recognition system may be available at an exit of the store to issue an alarm when the shopper attempts to leave the store with the non-scan item unresolved and/or unverified.

By way of example, the self-checkout helper device can also operate as an alert mechanism when positioned at the exit to a store. It can act as a simulated EAS-style pedestal alarm, alerting when a shopper of interest passes by. The front-facing camera can be used to track the identity of the shopper as well. The shopper would first be identified at the self-checkout using the self-checkout helper device situated there. An alert or exception activity would then be detected in conjunction with that shopper's transaction. This alert may even be identified after the transaction is completed and the shopper is moving away from the self-checkout register. The face identity is then communicated from the backend server to the EAS-style self-checkout helper device located at the store exit. Once that camera and the associated face recognition piece identifies the shopper walking toward the exit, the EAS-style self-checkout helper device then alerts to the presence of the shopper, and a description of the alert is presented on the device. The alert can consist of any of the following: a standard message, a description of the alert, a picture indicative of the alert, a video indicative of the alert, an audible tone, sound, voice, or other audible alert.

The self-checkout helper device can also be used as a communication medium between the attendant and the shopper. The SCO helper device and the attendant user device may be in communication with one another each equipped with user interfaces. The attendant user device may display video of the transaction received from the SCO helper device. The Self-checkout helper device may even display a picture of the remote operator to more personalize the experience. The picture can either be a real image of the person, a real video of the person operating in real-time, or it can be a stylized picture or video, such as an online avatar, either a still image or video. The attendant may be remotely enable such communication capabilities using one or more networked servers.

EXEMPLARY SCENARIOS

The following examples embodies the system and method disclosed herein. While particular scenarios are described, the examples are presented to showcase the applications of the SCO helper device, thus they are not intended to be limiting.

Example 1—No Non-Scanned Items

1. Shopper completes scanning items with no items left in shopping cart
2. Basket Based Non-scan item detection System determines nothing is left in the shopping cart
3. Shopper completes transaction "Shopper completes scanning items" means that the Shopper has finished scanning all of the items that they plan on scanning as part of the current transaction (even if there are merchandise items left un-scanned). The Shopper typically indicates to SCO the completion of Shopper's scanning of items by either clicking "transaction completed" or just starting the tender/payment process.)

Example 2—Shopper Forgets about Items in Basket

1. Shopper completes scanning items with merchandise item(s) left in shopping cart
2. Basket Based Non-scan item detection System identifies items in shopping cart
3. Shopper is prompted with choices via the SCO helper device:
   a. "I'm still scanning"
   b. "I Have Another Transaction"
   c. "I've Scanned Everything"
   d. "I need help"
4. Attendant is warned that the shopper may need help. This may be a medium-level or "yellow" alert (as opposed to a high level "red" alert). This is an optional step and may not be in all embodiments of the system.
5. Shopper selects the (a) "I'm still scanning" to indicate the shopper intends to scan rest of items in the cart on the current transaction
6. If a prior warning had been sent, then it is cleared for attendant when scanning resumes.

Example 3—Shopper Wants to Put Remaining Items on Another Transaction

1. Shopper completes scanning items with merchandise item(s) left in shopping cart
2. Basket Based Non-scan item detection System identifies merchandise item(s) in the shopping cart
3. Shopper is prompted with choices via the SCO helper device:
   a. "I'm still scanning"
   b. "I Have Another Transaction"
   c. "I've Scanned Everything"
   d. "I need help"
4. Attendant is warned that the shopper may need help. This may be a medium-level or "yellow" alert (as opposed to a high level "red" alert). This is an optional step and may not be in all embodiments of the system.
5. Shopper selects the (b) "I Have Another Transaction" to indicate the shopper will start a new transaction for the rest of the items
6. Shopper starts new transaction
7. If a prior warning had been sent, then it is cleared for attendant when new transaction is started Example 4—Basket Based Non-Scan Item Detection System Generates a False Alarm 1. Shopper completes scanning items with no merchandise items left in shopping cart
2. Basket Based Non-Scan item detection System incorrectly identifies merchandise item(s) in shopping cart
3. Shopper is prompted with choices via the SCO helper device:
   a. "I'm still scanning"
   b. "I Have Another Transaction"
   c. "I've Scanned Everything"
   d. "I need help"
4. Attendant is warned that customer may need help. This may be a medium-level or "yellow" alert (as opposed to a high level "red" alert). This is an optional step and may not be in all embodiments of the system.
5. Shopper selects the (c) "I've Scanned Everything" to indicate that there is nothing left to scan
6. Attendant is alerted to potentially suspicious activity
7. Attendant confirms that the shopper has no items left to scan and clears alert
8. Shopper leaves having completed transaction Example 5—Shopper is Confused/Flustered 1. Shopper completes scanning items with merchandise item(s) left in shopping cart
2. Basket Based Non-scan item detection System identifies merchandise item(s) in shopping cart
3. Shopper is prompted with choices via the SCO helper device:
   a. "I'm still scanning"
   b. "I Have Another Transaction"
   c. "I've Scanned Everything"
   d. "I need help"
4. Attendant is warned that customer may need help. This may be a medium-level or "yellow" alert (as opposed to a high level "red" alert). This is an optional step and may not be in all embodiments of the system.
5. Shopper selects the (d) "I need help" to indicate the customer is unsure on what to do next
6. Attendant is alerted that a customer needs assistance
7. Attendant walks over to Self-checkout device
8. Attendant assists shopper in scanning rest of the items and completes transaction Example 6—Shopper Attempts to Leave with Non-Scanned Items 1. Shopper completes scanning items with merchandise item(s) left in shopping cart
2. Basket Based non-scan item detection System determines items in shopping cart
3. Shopper is prompted with choices via the SCO helper device:
   a. "I'm still scanning"
   b. "I Have Another Transaction"
   c. "I've Scanned Everything"
   d. "I need help"
4. Attendant is warned that customer may need help. This may be a medium-level or "yellow" alert (as opposed to a high level "red" alert). This is an optional step and may not be in all embodiments of the system.
5. Shopper selects the (c) "I've Scanned Everything" to indicate that there is nothing left to scan
6. Attendant is alerted to potentially suspicious activity
7. Attendant sees that there are items still left to be scanned
8. Attendant walks over to Self-checkout device
9. Attendant assists shopper in scanning rest of the items and completes Transaction Example 7—Shopper Attempts to Leave with Non-Scanned Items and without Interacting with System 1. Shopper completes scanning items with merchandise item(s) left in shopping cart
2. Basket Based non-scan item detection System determines items in shopping cart 3. Shopper is prompted with choices via the SCO helper device:
   a. "I'm still scanning"
   b. "I Have Another Transaction"
   c. "I've Scanned Everything"
   d. "I need help"
4. Attendant is warned that customer may need help. This may be a medium-level or "yellow" alert (as opposed to a high level "red" alert). This is an optional step and may not be in all embodiments of the system.
5. Shopper begins leaving without selecting any choice
6. Non-scan item detection system determines that shopper is leaving.*
7. Attendant is alerted to potentially suspicious activity
8. Attendant walks over to Shopper and sees that there are items still left to be scanned
9. Attendant walks over to Self-checkout device with Shopper
10. Attendant assists shopper in scanning rest of the items and completes transaction Example 8—No Non-Scanned Items 1. Shopper completes scanning items with no items left in shopping cart
2. Basket Based Non-scan item detection System determines nothing is left in the shopping cart
3. Shopper completes transaction Example 9—Shopper Forgets about Items in Basket 1. Shopper completes scanning items with merchandise item(s) left in shopping cart
2. Basket Based Non-scan item detection System identifies items in shopping cart
3. SCO stops transaction processing and the Self-checkout helper Device prompts the shopper with choices:
   a. "I'm still scanning"
   b. "I Have Another Transaction"
   c. "I've Scanned Everything"
   d. "I need help"
4. Attendant is warned that the shopper may need help. This may be a medium-level or "yellow" alert (as opposed to a high level "red" alert). This is an optional step and may not be in all embodiments of the system.
5. Shopper selects the (a) "I'm still scanning" to indicate the shopper intends to scan rest of items in the cart
7. SCO returns to itemization mode and if a prior warning had been sent, then it is cleared for attendant.

Example 10—Shopper Wants to Put Remaining Items on Another Transaction

1. Shopper completes scanning items with merchandise item(s) left in shopping cart
2. Basket Based Non-scan item detection System identifies items in shopping cart
3. SCO stops transaction processing and the Self-checkout helper Device presents user with the choices:
   a. "I'm still scanning"
   b. "I Have Another Transaction"
   c. "I've Scanned Everything"
   d. "I need help"
4. Attendant is warned that the shopper may need help. This may be a medium-level or "yellow" alert (as opposed to a high level "red" alert). This is an optional step and may not be in all embodiments of the system.
5. Shopper selects the (b) "I Have Another Transaction" to indicate the shopper will start a new transaction for the rest of the items
6. SCO returns to previous mode and warning is cleared for attendant
7. Shopper completes transaction
8. SCO automatically prompts shopper to begin new transaction
9. Attendant can be alerted if shopper does not start new transaction after a predetermined period of time Example 11—Basket Based Non-Scan Item Detection System Generates a False Alarm 1. Shopper completes scanning items with no merchandise items left in shopping cart
2. Basket Based Non-scan item detection System incorrectly identifies merchandise item(s) in shopping cart
3. SCO stops transaction processing and the Self-checkout helper Device prompts the shopper with choices:
   a. "I'm still scanning"
   b. "I Have Another Transaction"
   c. "I've Scanned Everything"
   d. "I need help"
4. Attendant is warned that customer may need help on RAP/mobile RAP device. This may be a medium-level or "yellow" alert (as opposed to a high level "red" alert). This is an optional step and may not be in all embodiments of the system.
5. Shopper selects the (c) "I've Scanned Everything" to indicate that there is nothing left to scan
6. Attendant is alerted to potentially suspicious activity on RAP/mobile RAP device
7. Attendant confirms that the shopper has no items to scan and clears alert
8. Shopper completes transaction Example 12—Shopper is Confused/Flustered 1. Shopper completes scanning items with merchandise item(s) left in shopping cart
2. Basket Based Non-scan item detection System identifies merchandise item(s) in shopping cart
3. SCO stops transaction processing and the Self-checkout helper Device prompts the shopper with choices:
   a. "I'm still scanning"
   b. "I Have Another Transaction"
   c. "I've Scanned Everything"
   d. "I need help"
4. Attendant is warned that customer may need help on RAP/mobile RAP device. This may be a medium-level or "yellow" alert (as opposed to a high level "red" alert). This is an optional step and may not be in all embodiments of the system.
5. Shopper selects the (d) "I need help" to indicate the customer is unsure on what to do next
6. Attendant is alerted that a customer needs assistance on RAP/mobile RAP device
7. Attendant walks over to Self-checkout device
8. Attendant assists shopper in scanning rest of the items and completes transaction Example 13—Shopper Attempts to Leave with
Non-Scanned Items 1. Shopper completes scanning items with merchandise item(s) left in shopping cart
2. Basket Based non-scan item detection System determines items in shopping cart
3. SCO stops transaction processing and the Self-checkout helper Device prompts the shopper with choices:
   a. "I'm still scanning"
   b. "I Have Another Transaction"
   c. "I've Scanned Everything"
   d. "I need help"
4. Attendant is warned that customer may need help on RAP/Mobile RAP. This may be a medium-level or "yellow" alert (as opposed to a high level "red" alert). This is an optional step and may not be in all embodiments of the system.
5. Shopper selects the (c) "I've Scanned Everything" to indicate that there is nothing left to scan
6. Attendant is alerted to potentially suspicious activity on RAP/Mobile RAP
7. Attendant sees that there are items still left to be scanned
8. Attendant walks over to Self-checkout device
9. Attendant assists shopper in scanning rest of the items and completes transaction Example 14—NO Non-Scanned Items 1. Shopper completes scanning items with no items left in shopping cart
2. Basket Based Non-scan item detection System determines nothing is left in the shopping cart
3. Shopper completes transaction Example 15—Shopper Forgets about Items in
Basket 1. Shopper completes scanning items with merchandise item(s) left in shopping cart
2. Basket Based Non-scan item detection System identifies items in shopping cart
3. SCO stops transaction processing and prompts the shopper with choices:
   a. "I'm still scanning"
   b. "I Have Another Transaction"
   c. "I've Scanned Everything"
   d. "I need help"
4. Attendant is warned that the shopper may need help on RAP/mobile RAP device. This may be a medium-level or "yellow" alert (as opposed to a high level "red" alert). This is an optional step and may not be in all embodiments of the system.
5. Shopper selects the (a) "I'm still scanning" to indicate the shopper intends to scan rest of items in the cart
6. SCO returns to itemization mode and alert is cleared for attendant on the RAP/Mobile RAP device Example 16—Shopper Wants to Put Remaining
Items on Another Transaction 1. Shopper completes scanning items with merchandise item(s) left in shopping cart
2. Basket Based Non-scan item detection System identifies items in shopping cart
3. SCO stops transaction processing and prompts the shopper with choices:
   a. "I'm still scanning"
   b. "I Have Another Transaction"
   c. "I've Scanned Everything"
   d. "I need help"
4. Attendant is warned that the shopper may need help on RAP/mobile RAP device. This may be a medium-level or "yellow" alert (as opposed to a high level "red" alert). This is an optional step and may not be in all embodiments of the system.
5. Shopper selects the (b) "I Have Another Transaction" to indicate the shopper will start a new transaction for the rest of the items
6. SCO returns to previous mode and warning is cleared for attendant on RAP/mobile RAP device
7. Shopper completes transaction
8. SCO automatically prompts shopper to begin new transaction
9. Attendant can be alerted if shopper does not start new transaction after a predetermined period of time Example 17—Basket Based Non-Scan Item
Detection System Generates a False Alarm 1. Shopper completes scanning items with no merchandise items left in shopping cart
2. Basket Based Non-scan item detection System incorrectly identifies merchandise item(s) in shopping cart
3. SCO stops transaction processing and prompts the shopper with choices:
   a. "I'm still scanning"
   b. "I Have Another Transaction"
   c. "I've Scanned Everything"
   d. "I need help"
4. Attendant is warned that customer may need help on RAP/mobile RAP device. This may be a medium-level or "yellow" alert (as opposed to a high level "red" alert). This is an optional step and may not be in all embodiments of the system.
5. Shopper selects the (c) "I've Scanned Everything" to indicate that there is nothing left to scan
6. Attendant is alerted to potentially suspicious activity on RAP/mobile RAP device
7. Attendant confirms that the shopper has no items to scan and clears alert
8. Shopper completes transaction Example 18—Shopper is Confused/Flustered 1. Shopper completes scanning items with merchandise item(s) left in shopping cart
2. Basket Based Non-scan item detection System identifies merchandise item(s) in shopping cart
3. SCO stops transaction processing and prompts the shopper with choices:
   a. "I'm still scanning"
   b. "I Have Another Transaction"
   c. "I've Scanned Everything"
   d. "I need help"
4. Attendant is warned that customer may need help on RAP/mobile RAP device. This may be a medium-level or "yellow" alert (as opposed to a high level "red" alert). This is an optional step and may not be in all embodiments of the system.
5. Shopper selects the (d) "I need help" to indicate the customer is unsure on what to do next 6. Attendant is alerted that a customer needs assistance on RAP/mobile RAP device
7. Attendant walks over to Self-checkout device
8. Attendant assists shopper in scanning rest of the items and completes transaction Example 19—Shopper Attempts to Leave with Non-Scanned Items 1. Shopper completes scanning items with merchandise item(s) left in shopping cart
2. Basket Based non-scan item detection System determines items in shopping cart
3. SCO stops transaction processing and prompts the shopper with choices:
   a. "I'm still scanning"
   b. "I Have Another Transaction"
   c. "I've Scanned Everything"
   d. "I need help"
4. Attendant is warned that customer may need help on RAP/Mobile RAP. This may be a medium-level or "yellow" alert (as opposed to a high level "red" alert). This is an optional step and may not be in all embodiments of the system.
5. Shopper selects the (c) "I've Scanned Everything" to indicate that there is nothing left to scan
6. Attendant is alerted to potentially suspicious activity on RAP/Mobile RAP
7. Attendant sees that there are items still left to be scanned
8. Attendant walks over to Self-checkout device
9. Attendant assists shopper in scanning rest of the items and completes transaction Example 20—No Non-Scanned Items 1. Shopper completes scanning items with no missed items during the transaction
2. Non-scan item detection System determines nothing is left in the shopping cart
3. Shopper completes transaction Example 21—Shopper Misses Item(s) During the Transactions by Mistake 1. During scanning the shopper misses 1+ merchandise item(s) with without the corresponding scan(s)
2. Non-scan item detection System identifies event
3. SCO Helper Device prompts the shopper with choices:
   a. "I will reattempt to scan the item(s)"
   b. "It was an accidental non-merchandise item"
   c. "Everything scanned correctly"
   d. "I need help"
4. Attendant is warned that the shopper may need help. This may be a medium-level or "yellow" alert (as opposed to a high level "red" alert). This is an optional step and may not be in all embodiments of the system.
5. Shopper selects the (a) "I will reattempt to scan the item(s)" to indicate the shopper intends reattempt to scan item.
6. Shopper scans items previously missed
7. If a prior warning had been sent, then it is cleared for attendant.
8. Shopper completes transaction Example 22—Shopper Passes a Non-Merchandise Item During the Transaction 1. During scanning the shopper passes 1+ non-merchandise item(s) such as a hand bag or umbrella from an input region to an output region
2. Non-scan item detection System identifies event
3. SCO Helper Device prompts the shopper with choices:
   a. "I will reattempt to scan the item(s)"
   b. "It was an accidental non-merchandise item(s)"
   c. "Everything scanned correctly"
   d. "I need help"
4. Attendant is warned that the shopper may need help. This may be a medium-level or "yellow" alert (as opposed to a high level "red" alert). This is an optional step and may not be in all embodiments of the system.
5. Shopper selects the (b) "It was an accidental non-merchandise item(s)" to indicate to the system the item is not an item that is sold in the establishment.
8. Shopper continues to scan items and if a prior warning had been sent, then it is cleared for attendant.

Example 23—Shopper Attempts to Pass Merchandise Item(s) without Scanning it During the Transaction 1. During scanning the shopper passes 1+ merchandise item(s) from an input region to an output region
2. Non-scan item detection System identifies event
3. SCO Helper Device prompts the shopper with choices:
   a. "I will reattempt to scan the item(s)"
   b. "It was an accidental non-merchandise item(s)"
   c. "Everything scanned correctly"
   d. "I need help"
4. Attendant is warned that the shopper may need help. This may be a medium-level or "yellow" alert (as opposed to a high level "red" alert). This is an optional step and may not be in all embodiments of the system.
5. Shopper selects the (c) "Everything scanned correctly".
6. Shopper continues to scan items
7. The attendant is notified.
8. Attendant reviews notification and determines that there are at least one item that has not been scanned
9. Attendant approaches shopper(s) aids the shopper(s) in scanning the item(s) that have been missed.
10. Shopper completes transaction Example 24—Non-Scan Item Detection Systems Generates a False Positive 1. Shopper scans items without an additional item
2. Non-scan item detection System identifies incorrect non-scan event
3. SCO Helper Device prompts the shopper with choices:
   a. "I will reattempt to scan the item(s)"
   b. "It was an accidental non-merchandise item(s)"
   c. "Everything scanned correctly"
   d. "I need help"
4. Attendant is warned that the shopper may need help. This may be a medium-level or "yellow" alert (as opposed to a high level "red" alert). This is an optional step and may not be in all embodiments of the system.
5. Shopper selects the (c) "Everything scanned correctly" to indicate to the system has made a mistake.
6. Shopper continues to scan items 7. The attendant is notified.
8. Attendant reviews notification and determines that there are no items that has not been scanned
9. Attendant clears alert
10. Shopper completes transaction Example 25—Shopper is Confused/Flustered During the Transaction 1. During scanning the shopper passes 1+ item(s) from an input region to an output region without the corresponding scan(s)
2. Non-scan item detection System identifies event
3. SCO Helper Device prompts the shopper with choices:
   a. "I will reattempt to scan the item(s)"
   b. "It was an accidental non-merchandise item(s)"
   c. "Everything scanned correctly"
   d. "I need help"
4. Attendant is warned that the shopper may need help. This may be a medium-level or "yellow" alert (as opposed to a high level "red" alert). This is an optional step and may not be in all embodiments of the system.
5. Shopper selects the (d) "I need help" to indicate to the system that the shopper is unclear what happened and/or what the shopper needs to do next.
6. Attendant is notified
7. Attendant assists shopper in scanning item(s) that have previously not scanned
8. Attendant assists shopper with the rest of the transaction if necessary
9. Shopper completes transaction In addition to the examples above, similar functions can be deployed for a system environment where the SCO helper device is integrated with SCO and/or implemented by SCO as described in previous sections. Furthermore, in another embodiment for Counter-based Non-Scan Loss Prevention, the Self-checkout helper device can prompt and poll the shopper at the end of the transaction (rather than during the transaction as described in the scenarios in this section) much in the same way as described in the Basket-Based Non-Scan Loss Prevention section.

The embodiments and examples provided herein primarily illustrates the functions of the present invention in an environment involving a self-checkout terminal. It is to be understood that the functions, process, and/or methods described herein may also be implemented in other variety of POS (Point of Sales) system, including a traditional cashier checkout terminal.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the present disclosure. Thus, it is to be understood that the invention may therefore by practiced otherwise than as specifically described above. Many other modifications, variations, applications, and alterations of the present disclosure will be ascertainable to those having ordinary skill in the art.

What is claimed is:

1. A system for verifying a non-scan item detected at a self-checkout terminal, comprising:
   a video source comprising cameras and in communication with a processor, that generates a video by capturing and recording an area of interest at the self-checkout terminal within images, wherein the area of interest includes a transaction area around a self-checkout terminal including a bagging area of the self-checkout terminal;
   a non-scan item detection module representing executable instructions, which when executed by the processor, detects the non-scan item based on at least a portion of the video correlated with transaction data generated for a transaction by the self-checkout terminal;
   wherein the non-scan item detection module, which when executed by the processor, further detects when the non-scan item is in a shopping cart by:
      tracking the non-scan item within the transaction area;
      determining when the non-scan item is a particular item that is not being sold by a store associated with the self-checkout terminal;
      determining when the non-scan-item is removed from the shopping cart within the transaction area but not accounted for in the transaction data;
      comparing a model shopping cart image of the shopping cart and a current shopping cart image of the shopping cart obtained from the image;
      obtaining a difference between the model shopping cart image and the current shopping cart image as a non-scan item image for the non-scan item; and
      raising an alert when the non-scan item is tracked as being removed from the shopping cart but not accounted for in the transaction data, when the non-scan item is tracked as remaining in the shopping cart and not being removed from the shopping cart during the transaction, and when the non-scan item is a store item being sold by the store;
   the self-checkout terminal, in communication with the processor, equipped with a scanner, wherein the scanner detects an item being transacted at the self-checkout terminal during the transaction and generates the transaction data for the transaction; and
   a self-checkout helper module representing executable instructions, which when executed by the processor along with a computerized user interface, cause the processor to:
      receive the alert in response to the non-scan item detection module detecting the non-scan item when the non-scan item is: in the bagging area, in a bag within the bagging area, in the shopping cart, outside the bagging area on a floor, in an input area that is not designated for item collection, and other areas not specifically designated for collection of a purchased item;
      prompt a question, to the computerized user interface, to verify the alert;
      receive a response to the question, the response being inputted by a shopper via the computerized user interface;
      verify the alert by determining whether the alert is false-positive or not based on the received response;
      compare a scanner count for a total number of scan items from the transaction data, the scan items were scanned by the scanner against an item count identified from the video and determine whether any possible fraudulent activity occurred when the item count exceeds the scanner count; and
      use a combination of both video analysis and image analysis on the video when tracking the non-scan item and the scan items.

2. The system of claim 1 wherein the non-scan item detection module detects the non-scan item based on the transaction data generated by the self-checkout terminal and correlated to the video.

3. The system of claim 1 wherein the non-scan item detection module detects the non-scan item by comparing a frame of the video to a model image.

4. The system of claim 1 wherein the question is prompted after a predetermined time from receiving the alert.

5. The system of claim 1 further comprising an attendant user device in communication with the self-checkout helper module, wherein the self-checkout helper module is further configured to issue the alert to the attendant user device, if the alert is determined not to be a false-positive.

6. The system of claim 5 wherein the attendant user device receives input from the attendant to assist the shopper with the alert.

7. The system of claim 1 further comprising a facial recognition system comprising facial recognition executable instructions, which when executed by the processor cause the processor to perform processing comprising identifying an identity of the shopper based on facial features of the shopper obtained from the video that is provided by the video source.

8. The system of claim 7 further comprising an alarm device, in communication with the self-checkout helper module, wherein the alarm device issues an alarm when the identified identity of the shopper is linked to a fraudulent activity.

9. The system of claim 1 further comprising a motion detector equipped by the self-checkout terminal to detect a presence of the shopper entering in or exiting out the self-checkout terminal.

10. The system of claim 1 further comprising an alarm device, in communication with the self-checkout helper module, located at an exit of the store employing the self-checkout terminal, wherein the alarm device issues an alarm when the non-scan item is detected near the exit.

11. The system of claim 1 wherein the alert is at least one of visual message, text message, and audible message.

12. The system of claim 1 wherein the area of interest further includes an area associated with a shopping cart of the shopper.

13. A method of verifying a non-scan item detect at a self-checkout terminal, the method operated via a computer processing unit, comprising the steps of:
capturing a video, by a video source comprising cameras, of an area of interest at the self-checkout terminal within images recorded by the cameras for the video, wherein the area of interest includes a transaction area around the self-checkout terminal including a bagging area of the self-checkout terminal and including any shopping cart of a shopper;
detecting the non-scan item, with a non-scan item detection module represented by executable instructions and executed by a processor, based on at least a portion of the video and by identifying when the non-scan item is:
in the bagging area, in a bag within the bagging area, in the shopping cart, outside the bagging area on a floor, in an input area that is not designated for item collection, and other areas not specifically designated for collection of a purchased item, wherein identifying when the non-scan item is in the shopping cart by:
tracking the non-scan item within the transaction area;
determining when the non-scan item is a particular item that is not being sold by a store associated with the self-checkout terminal;
determining when the non-scan-item is removed from the shopping cart within the transaction area but not accounted for in the transaction data;
comparing a model shopping cart image of the shopping cart and a current shopping cart image of the shopping cart obtained from the image;
obtaining a difference between the model shopping cart image and the current shopping cart image as a non-scan item image for the non-scan item;
raising an alert when the non-scan item is tracked as being removed from the shopping cart but not accounted for in the transaction data, when the non-scan item is tracked as remaining in the shopping cart and not being removed from the shopping cart during the transaction, and when the non-scan item is a store item being sold by the store;
receiving the alert, with a self-checkout helper device, in response to the non-scan item detection module detecting the non-scan item based on correlating transaction data for a transaction with portions of the video and determining when the non-scan item is the particular item or the store item;
prompting a question to a computerized user interface in communication with the self-checkout helper device, to verify the alert;
receiving a response, via the computerized user interface, to the question;
verifying the alert, with the self-checkout helper device, by determining whether the alert is false-positive or not based on the received response;
comparing a scanner count for a total number of scan items from the transaction data, the scan items were scanned by a scanner against an item count identified from the video and determine whether any possible fraudulent activity occurred when the item count exceeds the scanner count; and
using a combination of both video analysis and image analysis on the video when tracking the non-scan item and the scan items.

14. The method of claim 13 wherein the step of detecting the non-scan item comprises detecting the non-scan item based on a transaction data obtained by the self-checkout terminal and the video.

15. The method of claim 13 wherein the step of detecting the non-scan item comprises comparing a frame of the video to a model image.

16. The method of claim 13 wherein the question is prompted after a predetermined time from receiving the alert.

17. The method of claim 13 further comprising the step of issuing the alert to the computerized user interface, with the self-checkout helper device, if the alert is determined not to be a false-positive.

18. The method of claim 13 further comprising, processing a facial recognition system comprising executable instructions that are, executed by the processor, causing the processor to perform processing comprising: evaluating facial features of the shopper that are obtained from the video and identifying an identity of the shopper from the facial features.

19. The method of claim 13 further comprising the step of detecting a presence of the shopper entering in or exiting out the self-checkout terminal with a motion detector equipped by the self-checkout terminal.

20. The method of claim 13 further comprising the step of issuing an alarm, with an alarm device in communication with the self-checkout helper device, when the non-scan item is detected near an exit, wherein the alarm device is located at the exit of the store employing the self-checkout terminal.

* * * * *